Patented Oct. 6, 1953

2,654,719

UNITED STATES PATENT OFFICE 2,654,719

PLASTICIZERS AND PLASTIC COMPOSITIONS

Edmund H. Schwencke, New York, N. Y., assignor to Elastomer Chemical Corporation, Nutley, N. J., a corporation of New Jersey No Drawing. Application May 22, 1947, Serial No. 749,879

4 Claims. (Cl. 260—23)

For the plasticization of synthetic resins, e. g. vinyl resins, remarkably satisfactory results have been obtained by the employment of a highly aromatic hydrocarbon oil, as described and claimed in my copending patent application Serial No. 663,639, filed April 19, 1946, now Patent No. 2,515,382. The preferred plasticizer therein disclosed is a hydrocarbon oil, preferably 100% aromatic, but in any event not less than 90% aromatic, consisting predominantly of three and four ringed molecules containing two to four short alkyl side chains. Highly aromatic hydrocarbon oils of such character are available commercially under the trade name Sovaloid C (produced by Socony-Vacuum). Such oils have the following physical characteristics:

Specific gravity, 60/60° F _____ 1.044–1.076
Viscosity, Saybolt Universal
 @ 100° F _____ 110 sec. minimum
Mixed aniline point, ° F. (critical solution temperature) _____ 65–75
Boiling range, ° F _____ 580–760

In preparing the plastic compositions described in my cited application preference was there indicated for a type of polymerized vinyl resin available in dry powder form having an extremely small particle size of about one half to one micron on the average, a specific example being a copolymer containing approximately 95% polyvinyl chloride and 5% polyvinyl acetate having an average molecular weight of approximately 13,000 and a particle size as stated above. Such materials are commercially available under the trade names Plastisol and Organosol. Examples of other resins that might be used are straight polyvinyl chloride and copolymers of vinyl chloride and vinyl acetate.

In the plasticizing procedure employing the described hydrocarbon oil, the resin and plasticizer were mixed, with mechanical agitation, and then passed through a colloid mill or homogenizer, while avoiding generation of excessive heat. Among various advantages of the stated plasticizers, particularly important features are their low cost and the fact that a liquid composition can be produced without the use of solvents or diluents such as are usually necessary with other plasticizers, i. e. of the ester type. In consequence thick coatings or massive molded bodies may be prepared directly with the liquid plastic composition, whereas with prior plasticizers, only very thin coatings could be produced because of the necessity for vaporizing and removing the diluent or solvent. Furthermore it was found that considerably larger proportions of plasticizer to resin may be employed with the described hydrocarbon oils, and the final product obtained by a simple heat curing operation is notably unaffected by many liquids and other materials, being remarkably resistant to aromatic hydrocarbons and to mixed hydrocarbons such as kerosene, which seriously injure vinyl resins that are made up with ester type plasticizers.

The present invention is directed to improvements in plasticizers and plastic compositions exemplified by those set forth in my pending application and briefly described hereinabove. Whereas excellent results have been had in carrying out the stated procedures, experience has indicated that uncured plastic compositions embodying vinyl resin and the hydrocarbon oil plasticizer may, over periods of time, exhibit an instability, i. e. a failure to maintain a desired homogeneity and plasticized condition, so as to require at least remilling or other treatment before use. An important feature of the present invention constitutes an improved plasticizer and improvements in plastic compositions, such that instability of the described type is avoided, whereby mixed plastic compositions containing relatively large quantities of plasticizer may be kept for long periods of time before curing or other use.

The discoveries of the present invention are also important in greatly facilitating the application of my previously disclosed improvements to a wide variety of compositions of the vinyl resin type, for example, providing effective use of vinyl resins having other than the extremely fine state of sub-division indicated as preferable in my cited application. Furthermore with the present improvements it has generally been found unnecessary to employ any homogenizing or special milling operation to effect the desired mixture of plasticizer with resin. Finally in accordance with a further treatment pursuant to my discoveries, even larger quantities of plasticizer can be used than previously indicated as most desirable, and the conditions are in fact believed to be such that the plasticizer partakes in some measure of the nature of a resin in the ultimate product. At the same time in all cases, the advantages heretofore found to characterize the use of the stated hydrocarbon oil plasticizers are fully realized.

More specifically, for example, it has now been discovered that treatment of the hydrocarbon oil to provide both an easier accomplishment and an effective stabilization of the ultimate resin and plasticizer mixtures may be achieved by incorporating with the oil an agent exemplified by aluminum stearate or calcium stearate. For instance, a hydrocarbon oil material such as Sovaloid C can be mixed with a small quantity of aluminum stearate and heated moderately with agitation until the stearate is homogeneously incorporated, presumably in solution as is apparent from the clear color of the mixture while it is hot. The resulting product, which becomes slightly cloudy but appears to keep indefinitely when cool, may then be used as a plasticizer for a wide variety of vinyl resins, for example, in proportions ranging up to 2½ parts of oil to 1 part of resin. Whether the very finely divided resin or some other material is used, the plasticization simply involves mixing the thus activated oil and the resin, conveniently with appropriate mechanical agitation. While special milling apparatus or the like may be used if desired—as, perhaps, when the operation must be greatly expedited—tests indicate that such apparatus may be dispensed with under ordinary circumstances. The resulting plastic composition, in its uncured state, exhibits a remarkable stability, and in fact, tests indicate that the resin does not tend to separate nor does the mixture tend to gel or is it otherwise impaired over any length of time of standing, whatever.

Although it is perhaps difficult to state the precise chemical or mechanical function of the activating ingredient incorporated in the plasticizer, it is presently believed that the agent so included, even in an extremely small quantity, behaves as a suspending or gelling agent in the ultimate plastic composition. As stated, the quantity of stearic acid derivative employed may be relatively small; for example in the case of water insoluble metal stearates, which are presently preferred, such as aluminum stearate, calcium stearate and lead stearate, an amount equal to 0.75% of the weight of the aromatic hydrocarbon oil is ordinarily sufficient. Experience indicates that for good realization of the desired stability the minimum amount of stearate is about one-half of one percent, a quantity of one percent being presumably fully ample for any circumstances at present contemplated. A practical upper limit, will ordinarily be about 2% where complete fluidity is desired.

Although plastic compositions embodying a plasticizer of the character stated appear capable of a very low fusing temperature, i. e. permitting curing at temperatures less than 200° F., the uncured, stabilized, resin-containing mixture of the present invention has been found to be unaffected by temperatures ordinarily encountered in storage, shipment or other handling to which such compositions might be subjected. In constrast, plastic compositions embodying previously used plasticizers, e. g. phthalates, phosphates and sebacates, frequently exhibit some impairment over periods of standing, especially in that they tend to gel or otherwise thicken simply on standing, this effect being even greater in warm weather.

The improved plasticizer may be conveniently described as being "activated" by the apparently uniform or homogeneous incorporation of the metal stearate, it being understood that the activation has reference to an improvement in the function and capabilities of the plasticizer and is not intended to imply that the stated type of hydrocarbon oil is actually ineffective or inactive without such ingredient. More specifically, as explained, one characteristic of such activation is to stabilize the subsequent plasticization of a synthetic resin with the highly aromatic hydrocarbon oil; another important characteristic is to facilitate the plasticizing operation, permitting its ready accomplishment with other resins than the very finely divided materials mentioned above.

According to present understanding the improved results are obtained by dissolving, or perhaps more accurately melting, the stearate within the oil, as distinguished from possible attempts to incorporate the activating agent by melting it first and then injecting it into the oil. Present experience also indicates that the described advantages are not obtained by adding such an agent after the oil and resin have been mixed; at least, it appears peculiarly desirable for the stearate to be thoroughly and uniformly incorporated with the hydrocarbon oil before the latter is introduced to the resin. Moreover, if a mixture of the hydrocarbon oil and resin is made to which the stearate is added, an attempt to melt the latter and thus disperse or dissolve it, by heating the mixture, results in a curing or partial curing of the resin and fails to achieve the desired state of suspension. On the other hand it does not now appear that there is any significant chemical reaction between the several ingredients in proper preparation of the plasticized mix—present belief being that the resin particles swell and fuse with the oil, so that the stearate already melted or dissolved in the latter is enabled to perform its function of maintaining the oil and resin dispersion.

As also stated above, further important attributes of the improved or activated plasticizer are its ready employment with a wide variety of forms or kinds of vinyl resin and the apparent lack of necessity for any special milling or like operation in forming the plasticized mix. The stability and keeping qualities of the product in all cases permit it to be stored, shipped and sold as a ready-mixed composition for use by manufacturers or other users of shaped plastic goods such as sheets, molded articles and coatings. The manufacturer then requires no milling or other expensive apparatus to mix his plastic, nor need he be acquainted with the technique of mixing procedure; his only operation is to pour or otherwise shape the material, and cure it, according to the use desired or to the design needed for his product.

By way of more specific example, one preferred manner of treating the hydrocarbon oil is first to make a paste of the desired quantity of stearate with a small amount of the oil, for instance in a colloid mill and then to add the major body of the oil. The entire mixture is moderately heated, for example to a temperature from about 150° F. to about 250° F., with suitable agitation until the stearate is fully incorporated in solution. By way of present preference it has been found that heating a mixture of Sovaloid C and 0.75% of aluminum stearate to a temperature just above 200° F., with agitation, for slightly more than one hour, provides an effective incorporation of the stearate, and thus a plasticizer highly activated for attainment of improved results as explained. A variety of vinyl resins have been effectively treated with such plasticizers, including Plastisol and Organosol, as well as the other vinyl compounds mentioned hereinabove, and also including, by way of example, straight polyvinyl chloride, and copolymers of vinyl chloride and vinyl acetate. It will be understood that if desired the treatment of the oil can be performed as a continuous process, i. e. by continuously milling the paste, mixing it with the principal body of oil and feeding the mixture through a suitable heat exchanger, preferably with provision for agitation.

A further feature of the invention is based on the discovery of an additional treatment of the highly aromatic hydrocarbon oil, which has been found peculiarly effective in permitting the use of relatively large proportions of plasticizer to resin in the ultimate composition. More specifically this treatment involves what is understood to be an acetyleneation of the hydrocarbon oil, at least in part. The treatment can be effected by passing acetylene gas through the oil, preferably with moderate heat, of say 200° to 210° F. The resulting acetylene-treated oil, or perhaps more specifically, the at least partially acetyleneated oil, appears to be chemically and otherwise stable over long periods of time, i. e. months, and has been found useful as a plasticizer in proportions up to three (or perhaps slightly more) parts of the oil to one part of the resin. According to present belief the curing procedure subsequently applied to the plastic composition then seems to involve some polymerization of the acetylene-treated oil; for instance, heating tests on the acetyleneated oil alone have resulted in a very decided thickening which does not seem to occur in the case of oil not so treated. In any event, the acetylene-treated plasticizer may be mixed with resins of the character described—for example any of those named hereinabove—to form plastic compositions of a desirably fluid nature, which may be employed for a wide variety of purposes, i. e. to make molded articles, thin or thick coatings, sheets or the like, with a simple heat-curing treatment.

As a specific example, the described highly aromatic hydrocarbon oil, such as one of the materials specifically named herein above, is first treated with an activating agent, e. g. aluminum stearate, in the manner already described. The activated oil is then introduced in a suitable kettle and through a tube extending to the bottom of the latter, acetylene gas is introduced at a sufficiently slow speed, i. e. so that little or no excess gas bubbles out to be wasted. Agitation is simultaneously provided by a stirring device near the top of the kettle, there appearing to be a very definite advantage in such method of operation whereby the agitation is countercurrent, so to speak, to the introduction of gas. The material is kept at an elevated temperature, say between about 150° to 250° F., preferably at 200° to 210° F. Depending on the size of the batch under treatment, tests have shown that after 15 or 20 minutes the gas begins to bubble out of the mixture, thus indicating that the reaction has proceeded as far as may reasonably be expected. While it has not as yet been feasible to make a definite chemical analysis of the completed plasticizer, increases in weight of the oil up to about 4% have been obtained by the acetyleneation. In any event it appears that the reaction may be of a quite complex or at least diffcultly ascertainable nature, preventing exact chemical characterization of the material; yet it is abundantly established that a definitely new product is obtained, yielding significantly novel results.

The acetylene-treated plasticizer can be mixed with vinyl resins to obtain thermally curable plastic compositions, by the same simple procedures set forth elsewhere herein for hydrocarbon oils not so treated. While useful plasticizers and correspondingly useful plastic compositions can be provided by application of the acetyleneation step (in the same manner) to non-activated oils, a particularly remarkable characteristic of this feature is its cooperation with the described activation of these highly aromatic hydrocarbon materials, e. g. in that neither the state of solution nor the subsequent stabilizing and dispersing attributes of the incorporated stearate appear to be impaired in any way by the acetylene treatment. In consequence the product of the combined process constitutes a plasticizer of remarkably useful properties for various purposes such as herein explained. It is capable of yielding the described new and stable plastic compositions with many types of vinyl resin, ordinarily requiring no particularly fine particle size nor the use of anything beyond simple mixing equipment to effectuate the plasticizing dispersion.

Whereas useful products can be made with fairly large proportions of the non-acetyleneated oil—for instance, at a ratio of 2.2 parts of oil to 1 part of resin by weight—the molding properties of the uncured composition are apt to be somewhat less satisfactory and the ultimate, cured article may be somewhat less tough and durable than when lower proportions of such plasticizer are employed. But if the acetylene-treated oil is used, remarkably strong and resistant products are easily achieved even with a proportion as high as three parts of plasticizer to one part of vinyl resin; and at the same time, by activating the oil according to my presently preferred method, the stated ease in compounding and the described stability of the uncured mix are fully realized. Curing temperatures for the various plastic compositions embodying either the acetyleneated or non-acetyleneated oil may often be quite low, e. g. 190° F. or slightly less; best results have usually been had by curing at 230° to 250° F.

It is to be understood that the invention is not limited to the specific embodiments herein disclosed by way of example, but may be carried out in other ways without departure from its spirit as defined by the following claims.

I claim:

1. A plasticizer for polyvinyl chloride and copolymers of vinyl chloride and vinyl acetate comprising a hydrocarbon oil which is at least 90% aromatic and characterized by the predominance of three and four ringed molecules containing two to four short alkyl side chains, said oil having a specific gravity greater than one, a mixed aniline point critical solution temperature between 65–75° F., a boiling range between approximately 580–760° F., said hydrocarbon oil having dissolved therein a water insoluble metal stearate in quantity not greater than 2% of the weight of the hydrocarbon oil and having incorporated therein acetylene in quantity not greater than 4% of the weight of the hydrocarbon oil.

2. A plastic composition comprising a vinyl resin selected from the group consisting of polyvinyl chloride and a copolymer of vinyl chloride and vinyl acetate, and a plasticizer consisting of a hydrocarbon oil which is at least 90% aromatic and characterized by the predominance of three and four ringed molecules containing two to four short alkyl side chains, said oil having a specific gravity greater than one, a mixed aniline point critical solution temperature between 65-75° F., a boiling range between approximately 580-760° F., said hydrocarbon oil having dissolved therein a water insoluble metal stearate in quantity not greater than 2% of the weight of the hydrocarbon oil, said resin and plasticizer being combined in proportions of from one half part to three parts of plasticizer to one part of resin, by weight.

3. A plastic composition comprising a vinyl resin selected from the group consisting of polyvinyl chloride and a copolymer of vinyl chloride and vinyl acetate, and a plasticizer consisting of a hydrocarbon oil which is at least 90% aromatic and characterized by the predominance of three and four ringed molecules containing two to four short alkyl side chains, said oil having a specific gravity greater than one, a mixed aniline point critical solution temperature between 65-75° F., a boiling range between approximately 580-760° F., said hydrocarbon oil having dissolved therein a water insoluble metal stearate in quantity not greater than 2% of the weight of the hydrocarbon oil, and having incorporated therein acetylene in quantity not greater than 4% of the weight of the hydrocarbon oil, said resin and plasticizer being combined in proportions of from one half part to three parts of plasticizer to one part of resin, by weight.

4. The method of preparing a plasticizer for vinyl resins selected from the group consisting of polyvinyl chloride and a copolymer of vinyl chloride and vinyl acetate which comprises mixing a hydrocarbon oil which is at least 90% aromatic and characterized by the predominance of three and four ringed molecules containing two to four short alkyl side chains and which has a specific gravity greater than one, a mixed aniline point critical solution temperature between 65-75° F. and a boiling point range between approximately 580-760° F. with a water insoluble metal stearate in proportions such that the stearate does not exceed 2% of the weight of the oil while maintaining a temperature of 150° to 250° F. so as to melt and dissolve the stearate in the oil, and then, while continuing to maintain said temperature, introducing acetylene gas into the mixture for a period of time sufficient to permit absorption of acetylene not exceeding 4% of the weight of the hydrocarbon oil.

EDMUND H. SCHWENCKE.

References Cited in the file of this patent

UNITED STATES PATENTS

| Number | Name | Date |
| --- | --- | --- |
| 1,764,837 | Hodson et al. | June 17, 1930 |
| 2,115,524 | Hochwalt et al. | Apr. 26, 1938 |
| 2,214,326 | Gregory | Sept. 10, 1940 |
| 2,266,544 | Freuler | Dec. 16, 1941 |
| 2,283,602 | Fiero | May 19, 1942 |
| 2,307,091 | Yugve | Jan. 5, 1943 |
| 2,325,963 | Lott et al. | Aug. 3, 1943 |
| 2,403,167 | Ballard | July 2, 1946 |
| 2,413,259 | Soday | Dec. 24, 1946 |
| 2,431,078 | Powell et al. | Nov. 18, 1947 |
| 2,449,928 | Corkery | Sept. 21, 1948 |
| 2,449,929 | Corkery | Sept. 21, 1948 |
| 2,497,045 | Killingsworth et al. | Feb. 7, 1950 |
| 2,515,382 | Schwencke | July 18, 1950 |

OTHER REFERENCES

Metasap Chemical Co.: Metallic Soaps, 1940, pp. 3, 4, 15, and 16.

Mattiello: Protective and Decorative Coatings, 1942, vol. 2, pages 622 and 623.